United States Patent [19]

Witsenhausen et al.

[11] 4,191,970
[45] Mar. 4, 1980

[54] INTERFRAME CODER FOR VIDEO SIGNALS

[75] Inventors: Hans S. Witsenhausen, Millburn; Aaron D. Wyner, Maplewood, both of N.J.

[73] Assignee: Bell Telephone Laboratories, Incorporated, Murray Hill, N.J.

[21] Appl. No.: 906,115

[22] Filed: May 15, 1978

[51] Int. Cl.² .................. H04N 5/21; H04N 7/12; H04N 7/04; H04L 1/10
[52] U.S. Cl. ................... 358/167; 358/136; 358/141; 340/146.1 AL
[58] Field of Search ............ 358/133, 136, 138, 141, 358/167; 340/146.1 AL, 146.1 AQ

[56] References Cited

U.S. PATENT DOCUMENTS

| | | | |
|---|---|---|---|
| 3,254,325 | 5/1966 | Dollard | 340/146.1 |
| 3,840,698 | 10/1974 | Hinoshita et al. | 358/136 |
| 3,887,763 | 6/1975 | Hinoshita et al. | 358/183 |
| 3,940,736 | 2/1976 | Inabe et al. | 340/146.1 AL |
| 3,944,973 | 3/1976 | Masson | 340/146.1 AL |
| 3,983,536 | 9/1976 | Tefler | 340/146.1 AL |
| 4,077,028 | 2/1978 | Lui et al. | 340/146.1 AL |

OTHER PUBLICATIONS

"Conditional Replenishment: A Promising Technique for Video Transmission", Mounts: Bell Laboratories Record: vol. 48, No. 4, Apr. 1970.
"Interframe Coding of Video Telephone Pictures", Haskell et al.: Proceedings of the IEEE, vol. 60, No. 7, Jul. 1972.
"A Data Compression System for the Transmission of Digitized Video Signals"; H. Ohnsorge, pp. 48.5–48.11; IEEE Int'l Conf. on Comm., vol. II, 1973.
"Noiseless Coding of Correlated Information Sources", Slepian et al., pp. 471–480, IEEE Transaction of Info. Theory, Jul. 1973.
"An Introduction to Error-Correcting Codes", Prentice-Hall, ©1970, S. Lin, pp. 33–57.
"Syndrome-Source-Coding and its Universal Generalization", IEEE Transactions of Info. Theory, vol. IT-22, No. 4, Jul. 1976, Ancheta, Jr.

Primary Examiner—Robert L. Griffin
Assistant Examiner—Aristotelis M. Psitos
Attorney, Agent, or Firm—Ronald D. Slusky

[57] ABSTRACT

Error-correcting code theory is utilized in a video signal interframe coding system which requires no transmitter frame memory. In the transmitter, each of a plurality of n-bit words representing respective portions of the current frame is transformed into the corresponding k-bit syndrome of a selected (n,k) error-correcting code. As the syndrome of each word is received at the receiver, the corresponding word from the previous frame is read out of a receiver frame memory and its syndrome is formed. The received and formed syndromes are subtracted from one another and passed through an error-correcting code decoder. The previous-frame word is added to the decoder output, yielding the current-frame n-bit word.

7 Claims, 2 Drawing Figures

INTERFRAME CODER FOR VIDEO SIGNALS

BACKGROUND OF THE INVENTION

The present invention relates to interframe coding techniques for video signals.

Video signals contain much redundant information, both within each frame and between successive frames. Numerous video signal coding techniques known in the art exploit these intraframe and interframe redundancies so as to reduce the amount of information needed to describe the video image.

In particular, interframe coding techniques generally involve comparing a current frame to that which preceded it and determining the differences between them. These differences are then what is encoded for transmission. This approach typically requires the transmitting station to include a one-frame delay element or "frame memory" so that the interframe comparisons can be made. Reconstruction, or decoding, of each frame at the receiving station also requires a frame memory, with the received encoded differences from one frame being combined with the reconstructed previous frame, stored in the frame memory, so as to reconstruct the current frame. Disadvantageously, the high cost of frame memories capable of storing entire video frames is, in general, a substantial deterrent to viable commercial implementation of interframe coding techniques heretofore known.

SUMMARY OF THE INVENTION

The present invention is directed to an interframe coding technique for video signals which requires a frame memory only at the receiver, thereby achieving a major reduction in the cost of the encoding hardware.

In an illustrative embodiment of the invention, each frame of the video signal to be encoded is divided into blocks, or words, of picture signals of predetermined length. Each block of the current frame is applied to a syndrome former for a selected error-correcting code. The syndrome former generates the syndrome of each picture signal block. The syndrome is then transmitted. Since the error-correcting code syndromes are shorter than the picture signal blocks, a substantial reduction in the average transmitted bit rate is achieved.

At the receiver, each received syndrome is combined with the syndrome of the corresponding block from the prior frame, the latter illustratively having been stored in a frame memory. The syndrome combination is then applied to an error-correcting code decoder, the output of which is an error word. As long as the current- and prior-frame blocks differ in no more than t places, where t is the error-correcting capability of the selected code, the difference word correctly indicates where the current- and prior-frame blocks differ. The difference word can therefore be combined with the prior-frame block to yield the current-frame block.

DETAILED DESCRIPTION

The present video signal interframe coding technique employs certain aspects of error-correcting code theory. To aid in explaining the principles of the invention, therefore, a block diagram of a simple error-correcting code system is shown in FIG. 1.

Figure 1:
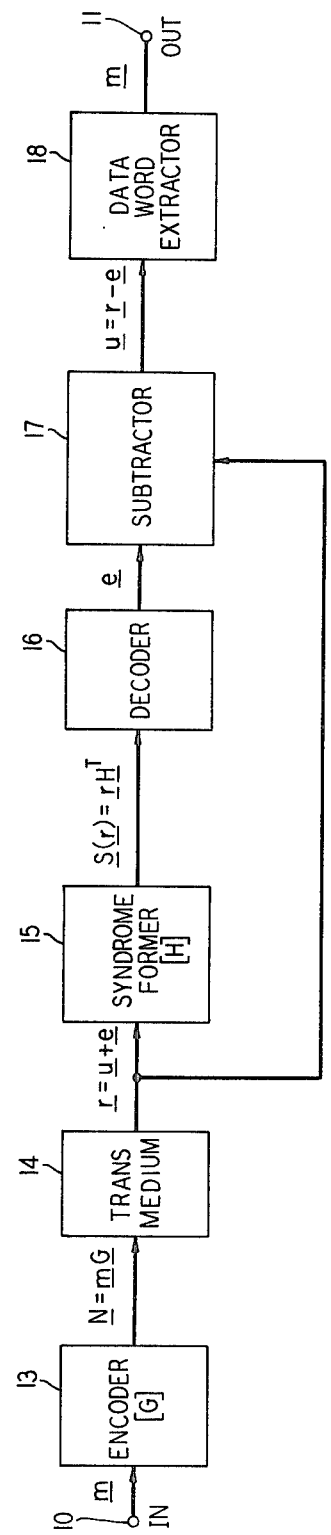
FIG. 1 is a block diagram of a simple prior art error-correcting code system useful in explaining the principles of error correcting code theory.

In the system of FIG. 1, a k-bit data word m is to be transmitted over a transmission medium 14 from an input terminal 10 to an output terminal 11. Inevitably, noise or other irregularities in medium 14 will cause occasional transmission errors, i.e., reversal of "0"s and "1"s in the transmitted data. If word m itself is transmitted over medium 14, it is, in general, not possible to detect the presence of, and therefore correct for, such errors.

In order to provide such error-correction capability, word m is passed through an encoder 13 ahead of transmission medium 14. Encoder 13 multiplies word m—which may be viewed as a $1 \times k$ matrix—by a $k \times n$ code generator matrix G, $n > k$, to form an n-bit code word ($1 \times n$ matrix) u. Code word u is what is transmitted over medium 14. There are $2^k$ predetermined values for n-bit code word u, one for each of the $2^k$ different possible k-bit data words.

Word r at the output end of transmission medium 14 may differ from code word u in one or more bit positions as the result of transmission errors, as previously discussed. The difference between transmitted code word u and the received word r is called error pattern, e. The error pattern may be found by forming the exclusive-OR function of words u and r on a bit-by-bit basis. Thus, for example, if $u = [111000]$ and $r = [111001]$, then $e = r - u = [000001]$. The "1" in the last bit position of word e indicates that an error occurred in the last bit position of word u. The advantage of transforming word m into the longer word u is that as long as the error pattern e contains t or fewer "1"s—t being a function of the particular code generator matrix G selected—all of the errors which occurred during transmission can be corrected. This is accomplished by finding an error pattern which has t or fewer "1"s and which, when added to r, yields one of the $2^k$ predetermined code words. If, in fact, there were no more than t errors, there will be only one such error pattern and the proper code word, u, will always be recovered.

An example: Table I shows a so-called standard array of a simple error-correcting code having $n = 6$ and $k = 3$. The first row of Table I shows the $2^k = 2^3 = 8$ possible 3-bit data words to be coded; the second row shows the corresponding 6-bit code words. The second-to-leftmost column of Table I shows the error patterns which this code is capable of correcting. Since the code is capable of correcting all one-bit error patterns, but only one two-bit error pattern, it is referred to as a 1-error-correcting code. The entire constellation of $2^6 = 64$ 6-bit words in Table I represents all possible values of received word r. Each horizontal row of the standard array shown in Table I is referred to as a coset, and the error pattern, i.e., the left-most entry of each coset, is called the coset leader. Adding the corresponding coset leader e to any received word r, will always yield the code word u, which must have been transmitted, again assuming, at most, t errors. In fact, the standard array is so constructed that the transmitted code word can be identified directly; it is the word at the top of the column in which the received word is located. Thus, for example, if $r = [100110]$, it is known that the error pattern must have been e=[010000] and that the transmitted word must have been u=[110110]. The data word m is thus known to have been m=[110]. If more than one error occurred (unless the error pattern happened to be 001001), the correct transmitted word cannot, in general, be ascertained. Thus, if multiple errors are expected, a different code—one capable of correcting more than one error—would have to be used.

source 19 and removes the intraframe redundancy therefrom. For each frame, the output of intraframe encoder 23 is comprised of a plurality of blocks, or words, of n bits each. The $i^{th}$ word, $X_i$, of the current video frame is applied to syndrome former 26 within video coder 22. Syndrome former 26 generates (n−k)-bit syndromes of a selected (n,k) code capable of correcting t errors. Syndrome $S(X_i)$ passes through the Table I

|  |  |  | Data Words |  |  |  |  |  |  |  |
|---|---|---|---|---|---|---|---|---|---|---|
|  |  |  | 000 | 001 | 010 | 100 | 011 | 101 | 110 | 111 |
|  |  |  | Code Words |  |  |  |  |  |  |  |
| Syndromes | 000 |  | 000000 | 001110 | 010101 | 100011 | 011011 | 101101 | 110110 | 111000 |
|  | 001 |  | 000001 | 001111 | 010100 | 100010 | 011010 | 101100 | 110111 | 111001 |
|  | 010 | Error | 000010 | 001100 | 010111 | 100001 | 011001 | 101111 | 110100 | 111010 |
|  | 100 | Patterns | 000100 | 001010 | 010001 | 100111 | 011111 | 101001 | 110010 | 111100 |
|  | 110 | (Coset | 001000 | 000110 | 011101 | 101011 | 010011 | 100101 | 111110 | 110000 |
|  | 101 | Leaders) | 010000 | 011110 | 000101 | 110011 | 001011 | 111101 | 100110 | 101000 |
|  | 011 |  | 100000 | 101110 | 110101 | 000011 | 111011 | 001101 | 010110 | 011000 |
|  | 111 |  | 001001 | 000111 | 011100 | 101010 | 010010 | 100100 | 111111 | 110001 |

It is possible to perform error correction using a look-up table of received words and the corresponding code words. However, a practical error correction code may have, for example, n=100, k=70, requiring storage of $2^{200}$ words of 100 bits each. This, of course, renders a look-up table approach prohibitively expensive and cumbersome.

There is, however, a simpler approach. For each k×n matrix G there exists a (k−n)×k matrix H called the parity check matrix. Multiplying the receiver vector r by the transpose of H, $H^T$, yields a 1×n matrix called the syndrome of r, represented as S(r). The received words of each coset all have the same syndrome, the syndromes for each coset being shown in Table I to the left of the coset leader. Thus, once the syndrome of a received word is ascertained by multiplying it by $H^T$, its coset leader, or associated error pattern e, is known. Thus u is known, since u=r−e.

The process of converting syndromes to coset leaders, referred to as decoding, could, again, be carried out via table look-up. This is still, however, usually an unmanageable approach since the number of syndromes (and, therefore, coset leaders) is $2^{n-k}$—in general still a very large number.

Relatively simple decoding circuits are known, however, which can be used to compute the coset leader from a given syndrome. Thus in FIG. 1, word r is applied to a syndrome former 15 which forms the product $rH^T$ to generate S(r). A decoder 16 generates e in response to S(r). The transmitted code word u=r−e is formed by subtractor 17. The original data word m is recovered from code word u in data extractor 18. The code implemented by matrix G is illustratively such that data extractor 18 does nothing more than drop (n−k) bits from word u to recover word m.

Figure 2:
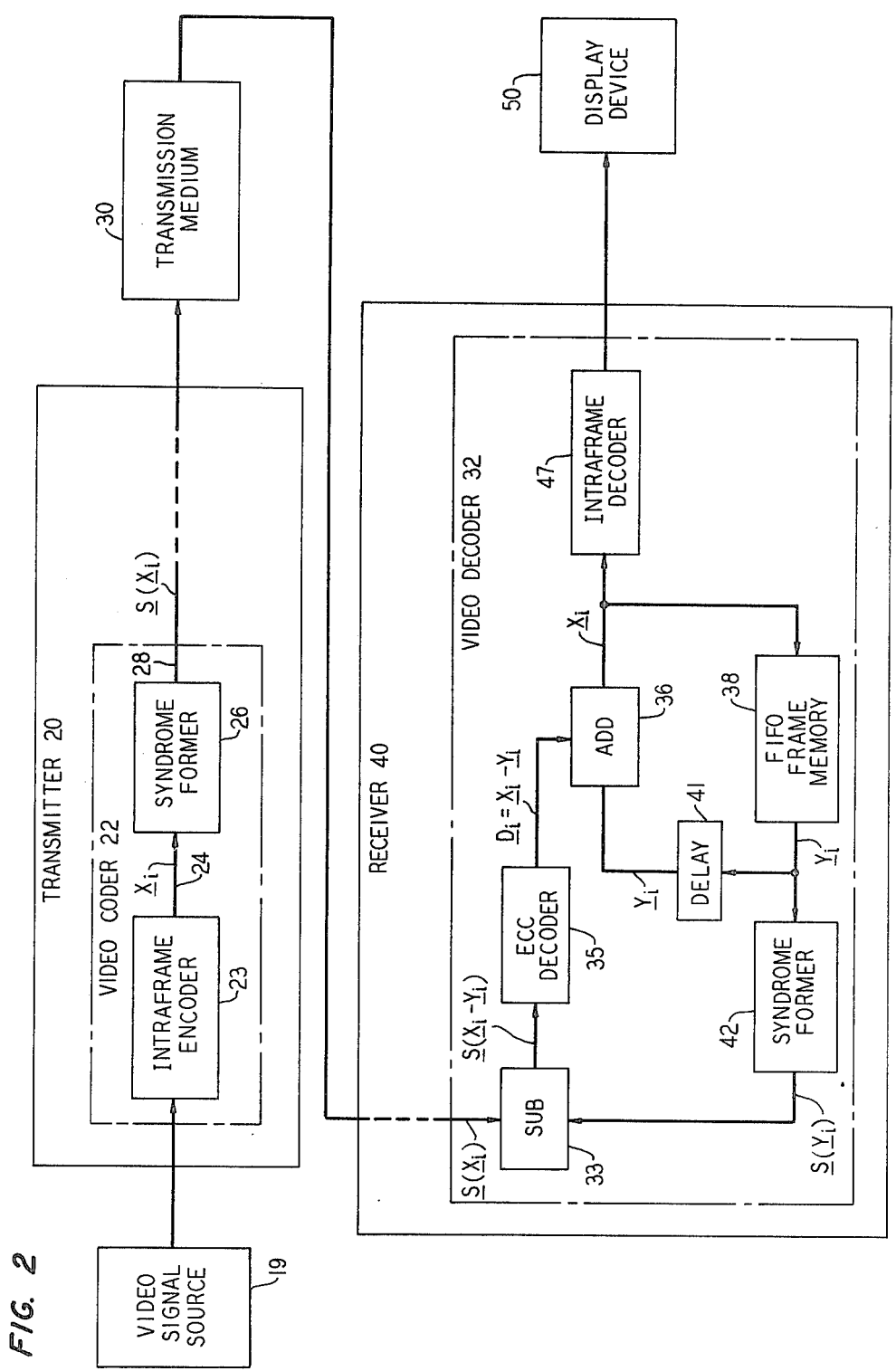
FIG. 2 is a block diagram of a video signal interframe coding system in accordance with our invention.

FIG. 2 is a block diagram of an interframe coder in accordance with our invention. A video signal provided by a source 19 passes through a transmitter 20, which includes a video coder 22, and thence over transmission medium 30 to a receiver 40 and display device 50. For purposes of illustration it is assumed that the video signal from source 19 is bilevel, i.e., each picture element can take on one of two possible intensity values. Thus, each frame of the video signal can be represented by a train of "0"s and "1"s.

Video coder 22 includes a conventional intraframe encoder 23 which receives the input video signal from remainder of transmitter 20 where other conventional signal processing steps such as framing, channel coding and modulation are performed. It then passes over transmission medium 30 to receiver 40.

Video decoder 32 in receiver 40 includes a first in-/first out (FIFO) frame memory 38 which stores the intraframe-encoded n-bit words from the previous video frame. The previous-frame word corresponding to word $X_i$ is denoted $Y_i$. As receiver 40 recovers the bits of $S(X_i)$ from transmission medium 30, the bits of $Y_i$ are read out of memory 38 and applied to a syndrome former 42. The latter may be similar to syndrome former 26. The output $S(Y_i)$ of syndrome former 42 is subtracted from the received syndrome $S(X_i)$ in subtractor 33. The resultant difference is $S(X_i−Y_i)$, which is applied to an error correcting code (ECC) decoder 35 for the selected (n,k) code.

The underlying premise of interframe video coding is that each frame of the image is very similar to that which preceeds it. In accordance with the invention, in particular, it is assumed that $X_i$ and $Y_i$ differ from each other in no more than t bit positions. Thus the pattern of bits in the quantity $(X_i−Y_i)$, herein defined as difference word $D_i$, is identical to one of the error-patterns which the selected t-error-correcting (n,k) code is capable of correcting. It will be recalled that applying the syndrome of a word to an error-correcting code decoder yields the corresponding error pattern. In the special case where the word is itself an error pattern, applying its syndrome to a decoder produces just the word. Since, by hypothesis, the pattern of bits in $D_i=(X_i−Y_i)$ is identical to an error pattern which the selected code is capable of correcting, the output of decoder 35 must be word $D_i$. Word $Y_i$ is at this time emerging from a delay unit 41. The latter provides the same amount of delay as is entailed in generating word $D_i$, as just explained. Word $Y_i$ is added to word $D_i$ in adder 36 to yield $X_i$. Word $X_i$ is read into memory 38, replacing $Y_i$. It is also applied to intraframe decoder 47, the output of which passes through the remainder of receiver 40 to display device 50.

The end result of the above described processing, then, is that n-bit word $X_i$ has been transmitted to receiver 40 by transmitting its (n−k)-bit syndrome—advantageously achieving a data rate reduction of $(n-k)/n$—without the use of a frame memory in the transmitter.

In general, errors will occur in the interframe coding process if word $X_i$ differs from the corresponding word $Y_i$ in the previous frame in more than t places. Thus, the anticipated picture statistics must be taken into account in selecting the error-correcting code which syndrome formers 26 and 42 and error-correcting code decoder 35 are based on. In general, it is anticipated that any of the numerous error correcting codes known in the art could be selected, depending on the application. See, for example, S. Lin, *An Introduction to Error Correcting Codes*, Prentice Hall, 1970, which teaches a number of error correcting codes as well as circuits, e.g. encoders, decoders, syndrome formers, for implementing them.

Given any selected code, however, there will always be some interframe differences that the system will not be able to transmit correctly. This may happen, for example, when there is a substantial amount of motion in the image or when the scene changes abruptly. This problem is not unique to our interframe coding technique but, rather, occurs in conventional interframe coding systems as well. Many of the known techniques for dealing with the situation may be employed here, if desired. One possibility, for example, is to periodically, e.g., several times per second, transmit the video image in a format which describes the image directly, rather than in syndrome-coded format. An additional or alternative technique, especially applicable to the present invention, is to use a code for which the high probability, the syndrome $S(X_i-Y_i)$ will be an illegal syndrome if $X_i$ and $Y_i$ differ in more than t places. Many of the so-called BCH codes, for example, have this property. The occurrence of an illegal syndrome can then be signaled back to the transmitter which, in response, can switch to an alternative, direct coding scheme.

Where it is desired to transmit video images in which each picture element has more than two elements—and is therefore represented by a plurality of bits—at least two alternatives are possible. Error-correcting codes are known for words in which each digit has a plurality of levels. Thus, syndrome formers 26 and 42 and error correcting code decoder 35 could simply be replaced by their equivalents for the selected multi-level code. Alternatively, the multi-level image can be treated as a plurality of bi-level images with the bits of each bi-level image being derived from a respective bit position in the binary numbers representing the picture element intensities. The images derived from the highest-order intensity bits will be quite similar from frame to frame, rendering them amenable to interframe coding in accordance with the present invention. The images derived from the lower-order bits will, in general, be quite different from frame to frame. These can be encoded using an alternative, conventional coding scheme.

Other applications of error correcting code theory to interframe video encoding are possible. For example, a syndrome former and frame memory may be provided at the transmitter for computing and storing $S(Y_i)$. As $X_i$ is generated, $S(X_i-Y_i)$ is calculated. If $S(X_i-Y_i)$ is a null vector, the error pattern corresponding thereto is also a null vector. It is then presumed that $X_i=Y_i$. Thus, no picture information need be sent to the receiver. Rather, $X_i$ is transmitted only if $X_i \neq Y_i$. The effective transmission rate is thus reduced. The transmitter memory requirement is also reduced over the transmitter memory requirement for conventional interframe coding arrangements since $S(Y_i)$, rather than $Y_i$, is stored.

Moreover, a transmission error occurs if and only if $X_i \neq Y_i$ but, $S(X_i+Y_i)$ nonetheless turns out to be a null vector. For given picture statistics, codes can be selected for which this will happen very rarely.

It will be appreciated that the preceeding merely illustrates the principles of the present invention. Numerous other arrangements embodying these principles may be devised by those skilled in the art without departing from their spirit and scope.

We claim:

1. A system for transmitting and receiving a video signal, each frame of said signal being represented by a plurality of blocks of picture signals, said system characterized by
   a transmitter which includes means for generating and transmitting a signal representing an error-correcting code syndrome of each of the blocks of a first frame of said signal, and
   a receiver which includes first means for combining each received syndrome signal with a signal representing the syndrome of a corresponding block from the frame prior to said first frame to form a combined syndrome signal, an error-correcting code decoder for decoding said combined syndrome signal to form a difference word signal, and second means for combining a signal representing said previous-frame block with said difference word signal, whereby a signal representing each of said first-frame blocks is recovered.

2. The invention of claim 1 wherein said receiver is further characterized by a frame memory for storing the blocks of picture signals representing said previous frame.

3. A decoder for decoding received error-correcting code syndrome signals, said syndromes being derived from respective blocks of picture signals of a first frame of a video signal, said decoder characterized by
   means for storing blocks of picture signals representing the frame of said video signal prior to said first frame, means including said storing means for forming the bit-by-bit exclusive-OR function of each received syndrome signal with a signal representing the syndrome of a corresponding block from the frame prior to said first frame to form a combined syndrome signal, an error correcting code decoder for decoding said combined syndrome signal to form a difference word signal, and means including said storing means for forming the bit-by-bit exclusive-OR function of a signal representing said previous-frame block with said difference word signal, whereby a signal representing each of said first-frame blocks is recovered.

4. A method for use in a system for transmitting and receiving a video signal, each frame of said signal being represented by a plurality of blocks of picture signals, said method characterized by the steps of
   generating a signal representing an error-correcting code syndrome of each of the blocks of a first frame of said signal,
   transmitting said syndrome signal to a receiver,
   combining each syndrome signal received by said receiver with a signal representing the syndrome of a corresponding block from the frame prior to said first frame to form a combined syndrome signal,
   decoding said combined syndrome signal to form a difference word signal, and
   combining a signal representing said previous-frame block with said difference word signal, whereby a signal representing each of said first-frame blocks is recovered.

5. The invention of claim 1 wherein each of said picture signals is a binary digit and wherein said first and second combining means each include means for forming the bit-by-bit exclusive-OR function of the signals being combined.

6. A method for decoding received error correcting code syndrome signals, said syndromes being derived from respective blocks of picture signals from a first frame of a video signal, said method characterized by the steps of forming the bit-by-bit exclusive-OR function of each received syndrome signal with a signal representing the syndrome of a corresponding block from the frame prior to said first frame to form a combined syndrome signal, decoding said combined syndrome signal to form a difference word signal, and forming the bit-by-bit exclusive-OR function of a signal representing said previous-frame block with said difference word signal, whereby a signal representing each of said first-frame blocks is recovered.

7. The invention of claim 4 wherein each of said picture signals is a binary digit and wherein each combining step includes the step of forming the bit-by-bit exclusive-Or function of the signals being combined.

* * * * *